(12) United States Patent
Meile et al.

(10) Patent No.: US 11,561,203 B2
(45) Date of Patent: Jan. 24, 2023

(54) OSCILLATION ANALYSIS ON AN OBJECT PRODUCED BY MEANS OF ADDITIVE MANUFACTURING

(71) Applicant: HEXAGON TECHNOLOGY CENTER GMBH, Heerbrugg (CH)

(72) Inventors: Silvan Meile, St. Gallen (CH); Claudio Iseli, Au (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 1007 days.

(21) Appl. No.: 16/262,739

(22) Filed: Jan. 30, 2019

(65) Prior Publication Data

US 2019/0234908 A1   Aug. 1, 2019

(30) Foreign Application Priority Data

Jan. 31, 2018   (EP) .................................... 18154500

(51) Int. Cl.
*G01N 29/12*     (2006.01)
*G01N 29/34*     (2006.01)
(Continued)

(52) U.S. Cl.
CPC ............. *G01N 29/12* (2013.01); *G01H 13/00* (2013.01); *G01M 7/025* (2013.01);
(Continued)

(58) Field of Classification Search
CPC .... G01N 29/12; G01N 29/045; G01N 29/348; G01N 29/4418; G01N 29/4436;
(Continued)

(56) References Cited

U.S. PATENT DOCUMENTS

| 5,402,582 A | 4/1995 | Raab | |
| 2012/0231225 A1* | 9/2012 | Mikulak | .................. D01F 8/12 |
| | | | 264/255 |

(Continued)

FOREIGN PATENT DOCUMENTS

| CN | 105108142 A | 12/2015 |
| CN | 107438488 A | 12/2017 |

(Continued)

OTHER PUBLICATIONS

English translation for JP-2013072669-A (Year: 2013).*
European Search Report dated Jun. 20, 2018 as received in U.S. Appl. No. 18/154,500.

*Primary Examiner* — Lee E Rodak
*Assistant Examiner* — Byung Ro Lee
(74) *Attorney, Agent, or Firm* — Maschoff Brennan

(57) ABSTRACT

Object analysis comprising measuring a frequency-dependent natural oscillation behavior of the object by dynamically-mechanically exciting the object in a defined frequency range (f) by means of generating a body oscillation by applying a test signal, and detecting a body oscillation generated in the object on account of the exciting. Moreover, the method involves simulating a frequency-dependent natural oscillation behavior for the object by generating a virtual digital representation of the object, and carrying out a finite element analysis on the basis of the virtual representation comprising dynamically exciting, in a simulated manner, the virtual representation into a virtual frequency range for generating a virtual body oscillation, calculating the virtual body oscillation generated in the object on account of the exciting in a simulated manner, and deriving an object state on the basis of a comparison of the measured natural oscillation behavior and the simulated frequency-dependent natural oscillation behavior.

15 Claims, 3 Drawing Sheets

(51) Int. Cl.
*G01M 7/02* (2006.01)
*G01N 29/04* (2006.01)
*G01H 13/00* (2006.01)
*G01N 29/44* (2006.01)

(52) U.S. Cl.
CPC ......... *G01N 29/045* (2013.01); *G01N 29/348* (2013.01); *G01N 29/4418* (2013.01); *G01N 29/4436* (2013.01); *G01N 29/4472* (2013.01); *G01N 2291/014* (2013.01); *G01N 2291/0231* (2013.01); *G01N 2291/0234* (2013.01); *G01N 2291/0258* (2013.01); *G01N 2291/0289* (2013.01); *G01N 2291/02827* (2013.01); *G01N 2291/102* (2013.01); *G01N 2291/267* (2013.01)

(58) Field of Classification Search
CPC ......... G01N 29/4472; G01N 2291/014; G01N 2291/0231; G01N 2291/0234; G01N 2291/0258; G01N 2291/02827; G01N 2291/0289; G01N 2291/102; G01N 2291/267; G01H 13/00; G01M 7/025; B22F 10/20; B22F 10/00; Y02P 10/25; B33Y 50/02; G01B 17/00; G01B 17/06
USPC .......................................................... 702/39
See application file for complete search history.

(56) References Cited

U.S. PATENT DOCUMENTS

| | | | |
|---|---|---|---|
| 2013/0160565 A1* | 6/2013 | Scherrer | G01F 1/66 73/861.355 |
| 2014/0041084 A1* | 2/2014 | Proksch | G01Q 20/00 850/33 |
| 2014/0305529 A1* | 10/2014 | Kroll | B22F 10/28 264/401 |
| 2015/0367446 A1* | 12/2015 | Buller | B22F 3/003 219/74 |
| 2016/0084802 A1 | 3/2016 | Yusuf et al. | |
| 2017/0138906 A1* | 5/2017 | Hartwig | G01N 29/4427 |

FOREIGN PATENT DOCUMENTS

| | | |
|---|---|---|
| DE | 43 25 337 A | 2/1994 |
| DE | 43 25 347 A1 | 2/1994 |
| EP | 1 474 650 A2 | 11/2004 |
| EP | 1 950 869 A1 | 7/2008 |
| JP | 2013072669 A * | 4/2013 |
| WO | 2016/156824 A1 | 10/2016 |
| WO | 2017/129294 A1 | 8/2017 |

* cited by examiner

OSCILLATION ANALYSIS ON AN OBJECT PRODUCED BY MEANS OF ADDITIVE MANUFACTURING

CROSS-REFERENCE TO RELATED APPLICATIONS

This application claims priority to European Patent Application No. 18155893.3, filed on Feb. 8, 2018. The foregoing patent application are incorporated herein by reference.

FIELD OF INVENTION

The invention relates to a method for testing an object produced by means of additive manufacturing, and to a corresponding apparatus.

BACKGROUND

In many technical areas of application there is a need to measure objects with high accuracy or with regard to the composition thereof. This applies in particular to the manufacturing industry, for which the measurement and checking of surfaces of workpieces are of great importance, in particular also for quality control purposes.

For such applications, coordinate measuring machines are used, for example, which enable precise measurement of the geometry of an object surface, typically with micrometer accuracy. Objects to be measured may be, for example, engine blocks, transmissions and tools. Known coordinate measuring machines measure the surface by producing a mechanical contact and scanning the surface. Examples thereof are gantry measuring machines, as described e.g. in DE 43 25 337 or DE 43 25 347. A different system is based on the use of an articulated arm, whose measuring sensor arranged at the end of the multipartite arm can be moved along the surface. Generic articulated arms are described for example in U.S. Pat. No. 5,402,582 or der EP 1 474 650.

The coordinative surface measurement makes it possible to ascertain geometric deviations at the workpiece from corresponding desired values. In this regard, a highly accurate indication concerning manufacturing precision can thus be made. It is thus possible to ascertain whether the shape and dimensioning of the produced part lie within a predefined tolerance and the component part should be regarded as a reject or a good part.

The geometric consideration particularly of the object surface by its nature and typically disregards the constitution of the object in the body interior thereof. Information regarding possible material defects or material fractures remain inaccessible.

However, such object properties which no longer relate solely to the geometry of the workpiece are becoming more important as a result of the further development of specific manufacturing methods. Aside from traditional manufacturing methods such as milling, grinding, polishing, welding or soldering, mention may be made here of, in particular, additive manufacturing or 3D printing. Whereas for instances of material processing by machining hitherto tolerances regarding the material removal have been of primary importance as variables to be considered, the relevant parameters in the case of additive manufacturing are different.

Additive manufacturing, often also referred to as 3D printing, differs from the traditional machining techniques mentioned typically by the fact that the manufacturing material is not progressively removed, rather the object to be formed is built up point-by-point or layer-by-layer. Material layer is applied over material layer and the respective layers, by local crosslinking or sintering, for example, are partially solidified and converted into a final material state. In this case, the starting material may be present in loose powder form, as viscous or as solid (e.g. as a wire). However, removing methods or combinations of both approaches are additionally known.

As a result of building up workpieces layer-by-layer during additive manufacturing, further critical manufacturing characteristics arise besides the traditional compliance with geometric manufacturing tolerances. In this case, increasing importance is being attached to internal object properties. This means in other words that for additive manufacturing it is necessary to ensure, in particular, that the material constitution within the body corresponds to a desired predefinition, i.e. is solidified as desired in the interior, too, in accordance with the respective manufacturing method. Moreover, undesired material stresses, cracks or air inclusions should be avoided in a finished object.

Nowadays standard measuring instruments such as a coordinate measuring machine are not sufficiently extensively equipped or appropriately designed for detecting such effects. Although superficial deviations such as cracks or deformations can be detected thereby, possible flaws within the body are regularly not measurable.

SUMMARY

It is therefore an object of some embodiments of the present invention to specify a method and a corresponding apparatus that provide improved object testing of an object built up by means of additive manufacturing.

In particular, it is an object of some embodiments of the invention to make an additively manufactured object testable with regard to a structural integrity.

These objects are achieved by the realization of the characterizing features of the independent claims. Features that develop the invention in an alternative or advantageous manner can be gathered from the dependent patent claims.

Some aspects of the invention are based on the concept, by means of a modal analysis of a component part manufactured by a 3D printing method, of determining the dynamic behavior of this oscillatory part and deriving information regarding the constitution of the part on the basis of this measurement. Such a methodology makes it possible to ascertain not only deviations from a desired part geometry but additionally deviations, irregularities and/or flaws in the part structure itself.

The database that can be used as a basis for carrying out a comparison of the measured oscillation behavior can be implemented by means of in particular multiple reference measurement with corresponding reference parts.

However, in particular the simulation of resonances that arise or are present in a part to be tested constitutes a further aspect of the invention. For this purpose, a virtual digital image of the object under test is generated and the excitation of an oscillation in the object and also the oscillation response of the object are calculated (numerically). It is possible by way of example to determine individual frequencies or frequency bands, which in turn respectively or in combination are characteristic of a specific manufacturing parameter (e.g. material density, size, shape, stiffness, etc.). By means of corresponding assignment of the frequencies or frequency bands to respective characteristics, on the basis of a deviation of a measured frequency from the associated simulated value, it is then possible to derive specific information about the relevant manufacturing parameters, e.g. whether the manufactured object has the predefined stiffness.

Some aspects of the invention thus relate to a method for object analysis comprising measuring a frequency-dependent natural oscillation behavior of the object by dynamically-mechanically exciting the object over a defined frequency range, wherein exciting the object is carried out by means of generating a body oscillation by applying a test signal (e.g. having a known oscillation or vibration). In addition, body oscillations generated in the object on account of the exciting are detected.

In addition, a frequency-dependent reference natural oscillation behavior for the object is simulated by generating a virtual representation of the object (e.g. digital model or CAD model) and carrying out a finite element analysis on the basis of the digital virtual representation comprising exciting, in a simulated manner, the virtual representation over a virtual frequency range for bringing about a body oscillation, said virtual frequency range at least overlapping the defined frequency range, and comprising calculating virtual body oscillations generated in the object on account of the exciting in a simulated manner.

As a result of the two steps above, a first (measured) natural oscillation behavior and a second (simulated) reference natural oscillation behavior of the object are thus obtained.

On the basis of a comparison of the measured natural oscillation behavior and the simulated reference natural oscillation behavior, an object state is then derived. The object state may provide information about the manufacturing quality of the object, i.e. whether the measured object has been manufactured within the scope of set tolerances, for example, or at least one object parameter exceeds the tolerance range.

This comparison firstly enables a statement to be made about whether the object has been manufactured correctly. In one embodiment of the invention, a specific object property can be assigned or related to a specific frequency range or a specific resonant frequency, wherein the object state has information concerning this specific object property.

Such an assignment can be carried out e.g. by means of simulation on objects with different parameters, wherein a frequency spectrum for the relevant object is calculated for a respective different parameter set. A corresponding effect of a parameter change on the oscillation behavior of the object can be derived from the differences that can be ascertained here in the spectra (e.g. position of the natural resonances).

In other words, the assignment can be carried out on the basis of multiple simulations of the frequency-dependent reference natural oscillation behavior for the object with different object parameters, wherein the object property is influenced in a targeted manner by changing at least one object parameter. For this purpose, effects of a parameter change on one or more object properties, such as e.g. the stiffness, may already be predictable or known.

The assignment can additionally be derived by means of targeted (local) variation of a reference object that is to be measured in multiple measurements, in particular to be measured before and after the variation brought about.

Conversely, the respective state of one or more object parameters can be deduced on the basis of the previous assignment and by a measurement of the natural oscillation behavior of an object.

Thus, on the basis of a comparison of a measured natural oscillation behavior and a simulated reference natural oscillation behavior for the specific frequency range or for the specific resonant frequency, it is possible to derive information regarding a level of correspondence of the object state to a desired object state. On the basis of this information, it is possible to derive a statement concerning the existence of a specific object fault. In other words, if the derived current object state corresponds at least largely, i.e. within the scope of predefined tolerances, to a desired state defined in respect thereof, the object can be regarded or marked as having been manufactured correctly.

In accordance with one embodiment, in the context of the simulating, it is possible for a measurement set-up to be at least partly concomitantly taken into account, i.e. concomitantly simulated. Thus, not just the object and its properties are simulated, but in addition the apparatus provided for measuring the object is simulated in parts.

Accordingly, the excitation of the apparatus is also simulated. By this means, the comparison can be carried out more precisely and with a correspondingly more reliable result.

Alternatively or additionally, it is possible to take account of inherent stresses in the object that may arise as a result of the real, additive production. Said stresses can be incorporated into an object model by simulation or by reference measurement.

Alternatively or additionally, it is possible to reduce or eliminate inherent stresses in the object by means of further processing processes.

For generating the virtual representation of the object (e.g. model), the object, in particular a reference object manufactured with high precision, can be measured and the measurement data can be processed. In this regard, e.g. the spatial extent or the outer shape can be detected metrologically. The model can thereby be created more precisely and "realistically". The virtual representation forms the basis for carrying out the oscillation simulation on the object.

As object state or object property which is assignable to a specific one or a plurality of natural frequencies, at least one or a combination of the following properties, stated non-exhaustively, is appropriate:
  stiffness of at least part of the object,
  integrity of the material bond (e.g. cracking),
  material state,
  material constitution,
  material composition,
  material stress (e.g. defects in the material),
  local material geometries, e.g. wall thickness,
  porosity within the body,
  cracking or formation of holes,
  damping characteristic,
  desired geometric parameters or deviations therefrom.

In a further embodiment, it is possible to adapt object parameters for generating the virtual representation of the object on the basis of a comparison of a first measured and a second simulated frequency-dependent natural oscillation behavior and reference natural oscillation behavior, respectively, of a reference object. By this means, it is possible to adapt the simulation for the calculation of the reference natural oscillation behavior of the object and to match it to the real manufacturing properties. For this purpose, the reference object can be built up under specific, ideal production prerequisites.

Some aspects of the invention additionally relate to a production method for producing or fabricating a metal-containing object using an object analysis as described above. The production method comprises at least the following steps:

obtaining, in particular generating, digital model data representing the object, point-by-point or layer-by-layer manufacturing of the object on the basis of the model data by applying (coating) and/or removing a manufacturing material point-by-point or layer-by-layer.

The object can be built up for example by means of providing the manufacturing material point-by-point or layer-by-layer (that is to say that the material is provided for the layer to be produced) in a defined amount and by means of at least partial, positionally accurate reshaping of the manufacturing material provided, in particular by partial melting of the manufacturing material. The material can be provided in the form of a filament or wire or else as pulverulent or granulated (e.g. metal-containing) manufacturing material. The reshaping can be carried out by means of directional laser radiation.

In particular, the method of Laser Metal Deposition (LMD) can be employed.

Carrying out a method for object analysis, in particular carrying out an above method for object analysis, comprising measuring a frequency-dependent natural oscillation behavior of the object by dynamically-mechanically exciting the object in a defined frequency range, wherein exciting the object is carried out by means of generating a body oscillation by applying a test signal, and, detecting a body oscillation generated in the object on account of the exciting, in particular a first natural resonance, simulating or measuring a frequency-dependent reference natural oscillation behavior for the object by generating a virtual digital representation of the object, in particular 3D model, or providing a physical reference object, by dynamically or dynamically-mechanically exciting the object or reference object in a simulated manner, calculating or detecting the body oscillation generated in the object or reference object on account of the exciting, and deriving an object state on the basis of a comparison of the measured natural oscillation behavior and the frequency-dependent reference natural oscillation behavior, and deriving a manifestation of a specific manufacturing-dictated object property on the basis of the object state.

For additive manufacturing of this type, the step of reshaping (bonding) the pulverulent material can be followed by removing the material still present in pulverulent form. In addition, further process steps can be performed, such as e.g. a thermal treatment or conventional mechanical processing of the object. Stresses that arose in the object as a result of the manufacturing can be reduced by means of a thermal treatment.

The resonance measuring method can be performed in conjunction with various process steps. In other words, such a measurement can be carried out not only after a 3D printing method has been concluded, but for example after a thermal treatment of the object. The method can additionally be applied a number of times. It is thereby possible to assess e.g. changes that have arisen as a result of the thermal treatment.

On the other hand, the measuring method can also be performed in order to better approximate simulation models to reality—e.g. during a series measurement in order, in parallel and together with quality assurance, also to be able to accurately map a variation diversity with a simulation.

In one embodiment, in the production method, on the basis of a comparison of a measured natural oscillation behavior and a simulated reference natural oscillation behavior for the specific frequency range or with regard to the specific resonant frequency, information regarding a level of correspondence of an object property specific to the additive manufacturing to a desired object property can be derived. For this purpose, a manufacturing property typical of 3D printing can be ascribed to specific characteristics of the natural oscillation behavior, e.g. a specific resonance peak. An object property of this type may be for example a densification (or a densification factor) of the manufacturing material converted from the pulverulent state to a solidly bonded state.

For solidification, i.e. for conversion from a powder to a bonded structure, the manufacturing material is exposed to an elevated temperature (heat input) at least at points and at times. This typically results not only in a bonding of the powder but moreover also in a change in the material state at a chemical level (e.g. oxidation). Such a property can likewise be stored and tested as an object property specific to the additive manufacturing.

In particular, it is possible to derive stiffness information for the object on the basis of the first measured frequency-dependent natural oscillation behavior and to determine a manufacturing quality specific to the generative manufacturing on the basis of the stiffness information, in particular on the basis of the comparison of the measured and the simulated frequency-dependent reference natural oscillation behavior.

In accordance with a further embodiment, the object is manufactured at least partly with lightweight construction in accordance with the digital model data and has at least one object portion which is defined by the solidified manufacturing material and which provides an, in particular sealed and/or gas-filled, cavity, wherein the object portion is shaped in hollow-cylindrical or tubular fashion, and/or the cavity has an inner stabilization structure, in particular a mechanically stabilizing web- or latticelike structure.

A lightweight structure having an internal stiffening structure can be built up accurately and in a targeted manner by means of generative (additive) manufacturing for comparatively small component parts. Such partly filigree internal structures are often not attainable with other manufacturing methods. In this case, additive manufacturing affords the further advantage that the internal structure can be built up with pinpoint accuracy, e.g. in a latticelike fashion, and thus, firstly, a high stability is producible and, in addition, a significant weight reduction (in comparison with conventionally produced parts of the same dimensioning) is achievable. What remains crucial here, however, is that the internal construction (stiffening structure within the body) is solidified continuously throughout and in line with the predefinitions. The testability of these properties is provided by the proposed approach according to the invention.

In particular, the manufacturing-dictated object property relates to the defined object portion of the lightweight construction, that is to say that e.g. (only) a critical part of the object is intended to be configured with a lightweight construction and the correct manufacturing thereof is intended to be ensured by testing.

During the manufacturing of structures of this type, the stability and loading capacity of the component part are typically crucially determined by internal structural elements. After an additive manufacturing process has been concluded, the constitution of these elements is difficult to check using conventional methods. The approach according to the invention by means of a resonance analysis of such an object and comparison with a desired spectrum having assigned object properties makes the additively manufactured lightweight object accessible to quality test inspection.

In accordance with one embodiment, the derived manifestation of a specific manufacturing-dictated object property can be fed as feedback for the additive manufacturing of the object and a corresponding adaptation of the additive manufacturing, in particular of the model data, can be carried out.

Some aspects of the invention furthermore relate to a test system for metallic objects manufactured point-by-point or layer-by-layer (e.g. additively), comprising a test unit configured for dynamically-mechanically testing the object produced by means of point-by-point or layer-by-layer, in particular additive, manufacturing and for deriving a first object state on the basis thereof. The test unit comprises an oscillation generator and an oscillation pick-up and is configured in such a way that the additively manufactured object is dynamically-mechanically excitable over a defined frequency range, wherein a body oscillation is generatable by means of the test signal being applied by the oscillation generator, that body oscillations, in particular resonances, generated in the object on account of the test signal are detectable by the oscillation pick-up, and that a first frequency-dependent natural oscillation behavior for the object is derivable on the basis of the detected body oscillations.

The test system additionally comprises a first control and processing unit configured for controlling the test unit.

The first control and processing unit is furthermore configured for (algorithmically) comparing the frequency-dependent (measured) natural oscillation behavior with a frequency-dependent (e.g. simulated) reference natural oscillation behavior, wherein the frequency-dependent reference natural oscillation behavior is derived by means of a virtual representation of the object and by means of carrying out a finite element analysis. The frequency-dependent reference natural oscillation behavior is determinable by means of dynamically exciting, in a simulated manner, the virtual representation into a virtual frequency range which at least overlaps the defined frequency range, and by means of calculating a virtual body oscillation generated in the object on account of the exciting in a simulated manner.

The first control and processing unit is additionally configured for deriving information regarding a level of correspondence between the first natural oscillation behavior and the frequency-dependent reference natural oscillation behavior, and for outputting the derived information.

In a development of the above system, the invention additionally relates to a system for the tested point-by-point or layer-by-layer, in particular additive, manufacturing of an object comprising such a test system. In the development, the system furthermore comprises a manufacturing unit configured for the point-by-point or layer-by-layer, in particular additive, manufacturing of the object on the basis of metal-containing, pulverulent and/or granulated manufacturing material, in particular a 3D printer.

The point-by-point or layer-by-layer manufacturing is implementable for example by means of repeatedly applying and/or removing a layer of a metal-containing, pulverulent or granulated (loose) or solid (e.g. wire-shaped) manufacturing material of defined thickness on a defined manufacturing surface, and e.g. by means of solidifying the manufacturing material partially at least with respect to the manufacturing surface, in particular by partially melting the manufacturing material, for example by means of directional laser radiation.

A second control and processing unit is configured for controlling the manufacturing of the object by means of the manufacturing unit on the basis of digital model data for the object. The virtual representation of the object is generated on the basis of the digital model data for the object.

In other words, the manufacturing of the object and the simulation of the oscillation characteristic of the object are carried out on the basis of a common database.

The first and second control units can be configured and designed as subunits, in particular as algorithmically implemented subprocesses, in a common control and processing unit.

Some aspects of the invention additionally relate to a computer program product which is stored on a machine-readable carrier or is embodied by an electromagnetic wave, for controlling or implementing at least the step of deriving an object state on the basis of a comparison of the measured natural oscillation behavior and the simulated reference natural oscillation behavior in a method described above. In particular, the computer program product is configured for controlling or implementing the steps of measuring a first frequency-dependent natural oscillation behavior of the object and simulating a frequency-dependent reference natural oscillation behavior for the object. The computer program product can be executed on a control and processing unit of a test system above.

The computer program product can thus comprise all the algorithms which make possible the control of specific steps or else the direct implementation of individual steps (e.g. creation or calculation on a digital model of the object).

BRIEF DESCRIPTION OF THE DRAWINGS

The method according to some aspects of the invention and the apparatus according to the invention are described in greater detail purely by way of example below on the basis of specific exemplary embodiments illustrated schematically in the drawings, further advantages of the invention being discussed as well.

DETAILED DESCRIPTION

Figure 1:
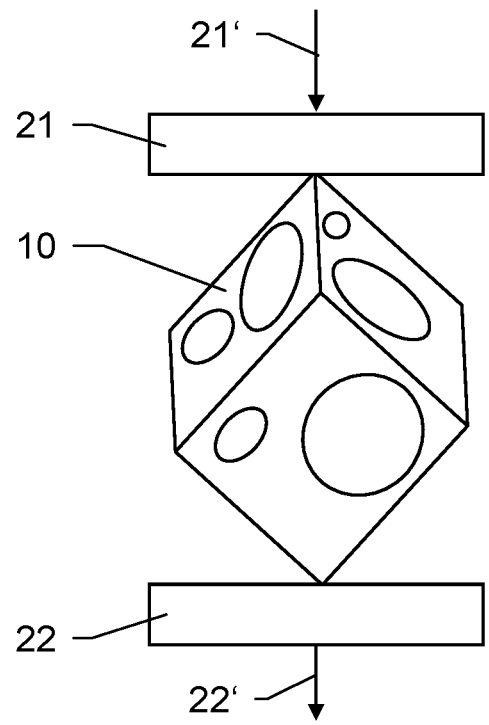
FIG. 1 schematically shows a set-up for a test method according to the invention.

FIG. 1 schematically shows a set-up of a test method according to the invention. The object 10 to be tested is clamped into a test apparatus designed for this purpose between two clamping elements 21,22. The clamping elements 21,22 can be configured for example as three-point receptacles, plates and/or elastic elements.

The arrangement of two three-point receptacles, i.e. one such receptacle per clamping element 21,22, makes it possible to provide a precise repositioning of the one object or many such objects 10 to be measured. Moreover, it is possible to avoid a deformation of the object 10 during clamping and removal. A three-point receptacle can be formed e.g. by three spherical elements.

For measuring natural oscillations and natural resonances of the object 10, an oscillation having a specific frequency and amplitude is induced at a first clamped end of the object 10. The oscillation is applied here e.g. by the clamping element 21. For this purpose, the clamping element 21 itself can comprise an oscillation generator or be mechanically coupled to such an oscillation generator and be designed for passing on the induced oscillation.

At a second, in particular opposite, end of the object 10, the body oscillations and resonances generated by the induced oscillation in the body to be tested are detected by means of an oscillation pick-up. For this purpose, the second clamping element 22 is provided with or coupled to such an oscillation pick-up. Besides an opposite arrangement, alternative arrangements of oscillation generator and oscillation pick-up are also conceivable.

The apparatus is designed such that the electromagnetic or electromechanical oscillation transducer or oscillation converter (oscillation generator and oscillation pick-up) together with the object 10 are mechanically decoupled or dynamically isolated from any further frame or holding structure. This is realized for example by the use of a connecting element (between holding structure and clamping element) having a distinctly different resonance. As a result, an energy transfer from or to a surrounding structure can be largely or completely avoided.

Preferably, an oscillation converter comprises or is configured as a piezoelement (e.g. a piezoelectric plate), wherein the latter has e.g. a thickness of approximately 2 mm. The piezoelement is connected in particular to a sample holder (see FIGS. 2*a* and 2*b*).

A resonance measurement (modal analysis) can also be carried out with different approaches than with the use of piezoelements. By way of example, it is alternatively possible to provide a laser doppler vibrometer (for detection) and a "voice-coil" shaker excitation (for excitation). Moreover, excitation can be effected by way of simple pulses.

In the example shown, the object 10 is excited by means of a signal 21' being applied to the first clamping element 21. The signal 21' can be generated by a frequency generator, subsequently amplified and transmitted to the piezoelement.

The excitation can be carried out for example by means of a harmonic excitation. In this case, the desired oscillation spectrum is detected in individual frequency steps. A harmonic, sinusoidal signal is preferably applied. A phase offset and/or a signal amplification (e.g. resonant oscillation) are/is determined on the basis of sensor signals obtained.

Tuning or sweeping through frequencies (sweep or chirp) constitutes a further possibility for excitation. In this case, a respective measurement is not carried out step by step, rather the excitation frequency is varied over a defined range while at the same time the oscillation response of the object is measured. This allows the desired measurement range (frequency spectrum) to be detected in a relatively short time.

Alternatively, the excitation can be carried out by means of a so-called hammer method. In this case, body oscillations can be excited in a broadband manner in the object by means of a (single) pulse (e.g. impact, hammer blow or noise).

The connection of the piezoelement to the sample holder or else to the element (holding structure) carrying or holding the piezoelement can be established for example by means of soldering (soft soldering) or by adhesive bonding.

In particular, the measurement set-up is calibrated with a reference body, e.g. a cube having a defined edge length and defined natural frequencies, preferably above 100 kHz, as a result of which the cube constitutes a suitable coupling element for measurement and calibration in smaller frequency ranges. The cube is manufactured from aluminum, for example, and has an edge length of 12 mm. In addition, the cube can be anodized (black) for electrical insulation.

Figure 2A:
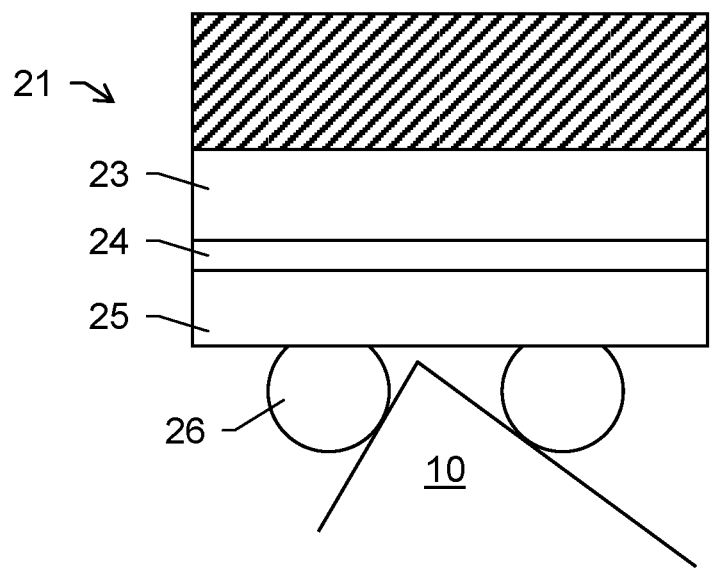
FIGS. 2a-b show embodiments for a clamping element for securing or mounting the part to be tested with an oscillation measuring apparatus.

FIG. 2*a* shows a first embodiment for a clamping element 21 for securing or mounting the part 10 to be tested with an oscillation measuring apparatus. The clamping element 21 comprises a mount 23, which provides a connection to a holding structure. A piezoelement 24 for generating or picking up oscillations is coupled to the mount 23. A sample holder 25 having three spherical elements 26 is connected to the piezoelement 24 and provides a transmission of oscillations between piezoelement 24 and measurement object 10. By means of the three-point receptacle defined with spherical elements 25, the object can be clamped in precisely and repeatedly for measurement.

Figure 2B:
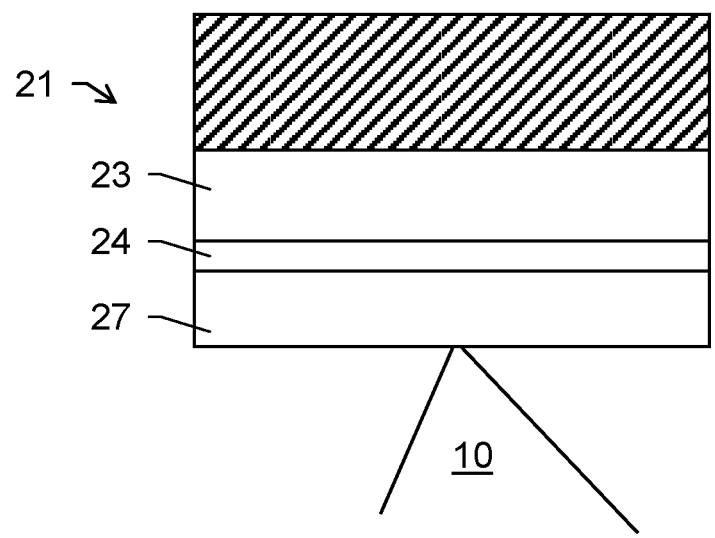

FIG. 2*b* shows a second embodiment for a clamping element 21 for securing or mounting the part 10 to be tested with an oscillation measuring apparatus. The clamping element 21 according to FIG. 2*b* differs from that from FIG. 2*a* in that the three-point receptacle is replaced by a lamellar receptacle 27. This variant of the clamping element 21 allows the object or objects having different dimensionings to be clamped in rapidly and flexibly.

Figure 3A:
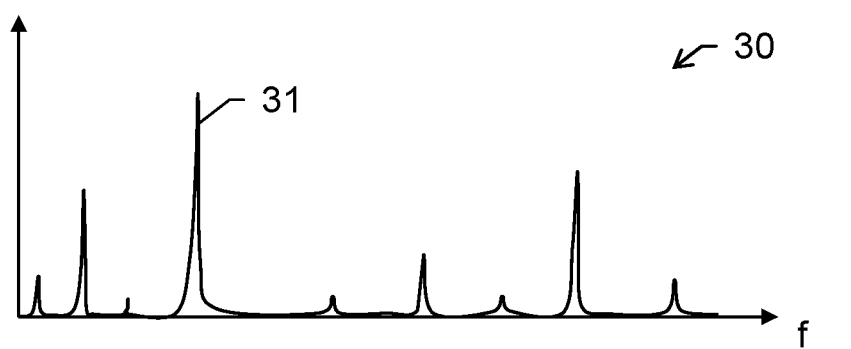
FIGS. 3a-b show a measured frequency spectrum with reference spectrum according to the invention.

FIG. 3*a* shows a frequency spectrum 30 for a measured object, said frequency spectrum having been detected for example by means of an arrangement according to FIG. 1. The natural oscillation behavior for the object is thus detected in a frequency-dependent manner over a defined frequency range. It goes without saying that, alternatively or additionally, the phase profile can be recorded and the existence of local natural frequencies can be deduced on the basis of detected phase jumps (not illustrated).

Before carrying out the measurement on an object to be tested, the system was calibrated by means of a calibration body at least for the measurement range to be detected, that is to say that the oscillation behavior of the set-up, in particular in an object-independent manner, was determined for this range.

The measured frequency range extends approximately from 500 Hz, in particular 10 kHz, to 80 kHz, in particular 24 kHz. The lower frequency limit is given by the available bandwidth of the amplifier used. The upper frequency limit is given by the dynamic behavior of the set-up.

The spectrum can optionally be detected with or without a damping, wherein the distribution of the locations of the natural frequencies remains significant but the excitations in the body can be ascertained with different gain factors.

On the basis of a width of a resonance excursion, firstly a damping can be measured and then the true resonant frequency can be calculated taking account of the damping. Alternatively, the damping can be integrated into an FEM model or else be disregarded depending on accuracies required.

As a result, a spectrum 30 is generated, wherein respective oscillation amplitudes or amplifications are detected over a specific frequency range f. Individual natural frequencies of the object tested are identifiable in said spectrum 30. By way of example, a first natural resonance 31 is referenced at a frequency of approximately 12 500 Hz. Such a natural frequency may represent a characteristic property of the object. By way of example, information about a mechanical object property linked to the specific natural frequency can be obtained by means of the measurement of the frequency and by means of comparison with a previously determined frequency atlas or desired frequency spectrum for the object.

For obtaining object information of this type, it is also possible to utilize relative frequency information. By way of example, spacings between measured frequencies and a reference frequency and/or spacings between individual measured frequencies are used in this case. Information concerning this object property can accordingly be derived on the basis of a spacing that is ascertainable in this way. Moreover, it is thereby possible to carry out a comparison, an assessment and/or adaptation of a simulation in relation to reality. Moreover, information can be derived from the relation between a reference and a measurement performed.

Besides the evaluation of frequencies, alternatively or additionally, relative amplitudes and/or damping behavior can be analyzed. A further refinement of the measurement can be achieved by additionally using these parameters.

A frequency atlas or desired frequency spectrum for a specific type of object can be derived e.g. by repeatedly measuring one or more reference objects, wherein the reference objects in each case correlate as well as possible with an ideally manufactured object.

Figure 3B:
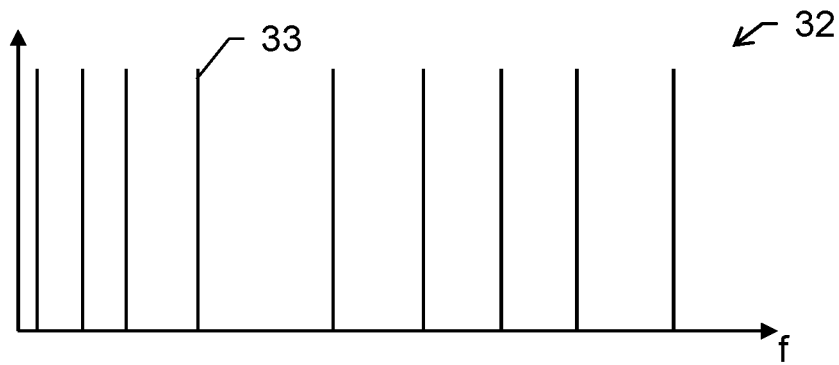

Alternatively, the desired frequency spectrum can be derived on the basis of a simulation on a virtual representation for the object. In this case, it is possible to determine individual significant frequencies for an object, as is shown by way of example in FIG. 3b.

The reference spectrum 32 (reference frequency atlas or desired frequency spectrum) indicates the frequencies or frequency bands for which the additively manufactured object to be tested should have a resonance or correspondingly magnified frequency response. By way of example, here once again a specific reference frequency 33 is designated at approximately 12 500 Hz. In the measurement of the oscillation response of the object, primarily the frequency respectively determined is relevant; the absolute intensity of the body oscillation that is measured for this frequency remains of secondary importance.

According to the invention, an assignment of specific object properties can be carried out by means of simulations on the basis of virtual object models with different object parameters or stored object properties. For this purpose, by way of example, a first digital representation of the object as a digital model is generated and this model is provided with defined model properties, e.g. a local stiffness of the object. A first simulation with this first digital representation then yields first significant natural frequencies for the object. In addition, a second representation of the object with other specifically altered model properties, e.g. an (only) altered location stiffness, is generated. A simulation is in turn carried out with regard to second significant natural frequencies. A difference between the first and second calculated natural frequencies can then be assigned to the corresponding change in the model property, e.g. local stiffness.

On the other hand, likewise according to the invention, an assignment of specific object properties to natural frequencies can be carried out by means of a targeted manipulation of a reference object. For this purpose, the object is measured before and after the manipulation with regard to the oscillation properties. Possible differences in the frequency spectra can then be assigned to the manipulation. In this regard, e.g. with knowledge of frequent occurrence of a specific material crack during manufacturing, this fault can be simulated in a targeted manner and its effect on the natural oscillations of the object can be derived. It goes without saying that such manipulations can be carried out a number of times and for different manufacturing characteristics and a database of corresponding breadth can thus be stored.

Such a database makes it possible, on the basis of a resonance measurement on an object, to deduce the latter's physico-mechanical properties, such as, for example, stiffness, local density, structural integrity, cracks or porosity within the body. Thus, with a single measurement on an additively manufactured object, a plurality of items of information about the object state including in the interior thereof may become accessible in part simultaneously.

The information content generatable by this means is thus advantageous in particular for additively manufactured, metallic objects. Manufacturing features which have not been recognizable or assignable hitherto using conventional methods can be identified unambiguously with the aid of the present invention. In other words, manufacturing faults cannot just be generally recognized, but additionally localized and named. In the case of additively manufactured (metallic) objects, manufacturing faults of this type occur in particular as insufficiently bonded manufacturing material (i.e. for example metallic powder material that has not fused or bonded as desired), wherein the location of the fault is situated in the interior of a workpiece. This also includes microcracks, undesired porosities or only partly melted powder material, wherein this enumeration should not be regarded as exhaustive.

The method according to the invention is directed, in particular, to objects which are built up from a metal-containing basic material and generatively by means of a powder bed method. This includes, inter alia, selective laser fusion, selective laser sintering or electron beam fusion. It is precisely in such processes, the starting material of which is present in granular or pulverulent form, that it is important to avoid and/or recognize production faults at locations that are no longer directly accessible after manufacturing (e.g. in the interior of the workpiece). Locations without sufficient material bonding should be avoided in view of structural quality and robustness. With the method according to the invention, a desired production quality of a part manufactured generatively in this way can be recognized and verified. By way of example, non-superficial faults in the product are able to be recognized by measurement.

Figure 4A:
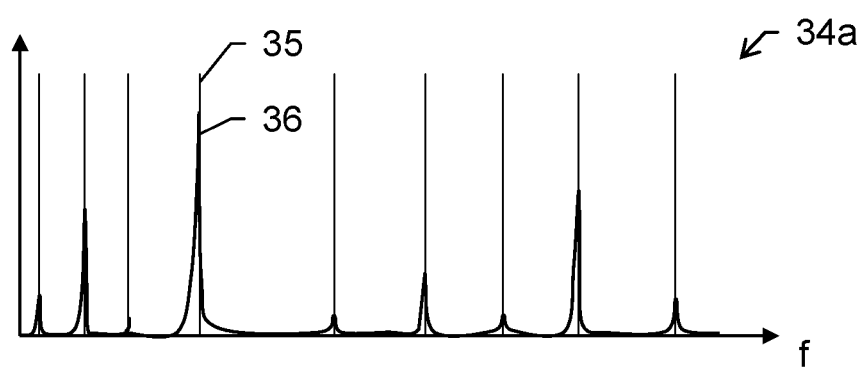
FIGS. 4a-b show an illustration of an object testing principle according to the invention.
Figure 4B:
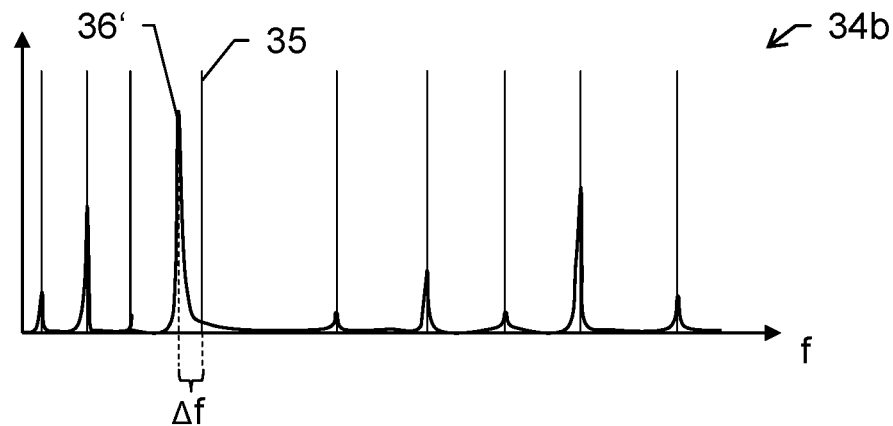

FIGS. 4a and 4b illustrate an object testing principle according to the invention. FIG. 4a shows a frequency spectrum 34a for an object, wherein both the expected reference natural oscillations for specific frequencies in the form of vertical lines and a measured frequency spectrum are illustrated. A reference resonance 35 for the object is once again indicated by way of example, said reference resonance being derived on the basis of a simulation for a desired object. Furthermore, said reference resonance 35 is assigned a specific object property, here the nonexistence of a crack in the already bonded manufacturing material at a specific location of the object.

The measured oscillation peak 36 in the spectrum, with regard to the frequency thereof, can be unambiguously assigned to the reference resonance 35, which is in turn an indication of correct manufacturing, i.e. without cracking, of the object. This is derivable from the correspondence of the center frequency of the peak 36 and the simulated reference resonance 35. A tolerance range can be defined for the correspondence, that is to say that an exact correspondence need not necessarily be ascertained, rather the measured center frequency is committed to deviate from the simulated reference resonance 35 for example by a maximum of 10 Hz, 20 Hz or 30 Hz, wherein correct manufacturing of the object can still be assumed. It goes without saying that the width of such a tolerance range depends on the manufacturing feature to be recognized in each case and, e.g. for a crack to be recognized, differs distinctly from a tolerance for an object stiffness to be measured.

Besides recognizing cracking, the above approach also makes it possible to identify other production faults, such as e.g. pore formation, pore size or a constitution of the metal microstructure.

FIG. 4b shows the result of a further implementation of object testing according to the invention. The stored reference spectrum corresponds to that in FIG. 4a. The resonance measurement was performed on a different object.

The measured frequency spectrum for the object then tested differs from that in FIG. 4a in particular with regard to the position of the peak 36'. The resonant frequency identified by the signal 36' differs significantly from the reference resonance 35 by a frequency difference Δf, i.e. the measured frequency lies outside the tolerance around the reference resonance 35.

For the tested object for which the spectrum 34b was determined, it is then possible, solely on the basis of the measurement carried out, to ascertain that the object has a crack (or some other specifically assigned production fault) at a known location since the occurrence of said crack is associated with a deviation with respect to the reference resonance 35. Further measurements or tests of the object become superfluous as a result. As a result, the object can rapidly be marked as defective and thus as a reject.

The method according to the invention not only allows possible production faults to be recognized, but additionally provides a means for correspondingly adapting the manufacturing process itself. In other words, the test result can be fed to the manufacturing process as feedback and a sequence of the additive manufacturing can be adapted such that the probability of a specific production fault occurring can be reduced. By way of example, if cracking is ascertained to an increased extent at a specific location, it is possible, selectively at said location, for a larger amount of material to be melted or for the material to be melted over a longer period of time or at increased temperature.

The project which led to the present patent application received funding on the part of the EU Program for Research and Innovation "Horizon 2020" under grant agreement No. 690689.

It goes without saying that these illustrated figures merely schematically illustrate possible exemplary embodiments. According to the invention, the different approaches can likewise be combined with one another and with methods of modal analysis or for natural oscillation determination from the prior art.

What is claimed is:

1. A method for object analysis comprising:
   measuring a frequency-dependent natural oscillation behavior of the object by
     dynamically-mechanically exciting the object in a defined frequency range (f), wherein exciting the object is carried out by means of generating a body oscillation by applying a test signal, and
     detecting the body oscillation generated in the object on account of the exciting,
   simulating a frequency-dependent reference natural oscillation behavior for the object by
     generating a 3D model as a virtual digital representation of the object, wherein inherent stresses in the object are incorporated into the virtual digital representation by simulation or by reference measurement,
     carrying out a finite element analysis on the basis of the virtual digital representation comprising:
       dynamically exciting, in a simulated manner, the virtual digital representation into a virtual frequency range for generating a virtual body oscillation, said virtual frequency range at least overlapping the defined frequency range,
       calculating the virtual body oscillation generated in the object on account of the exciting in a simulated manner, and
   deriving an object state on the basis of a comparison of the measured frequency-dependent natural oscillation behavior and the simulated frequency-dependent reference natural oscillation behavior.

2. The method according to claim 1, wherein a specific object property is assigned to a specific frequency range or a specific resonant frequency and the object state has information concerning the specific object property.

3. The method according to claim 2, wherein the specific object property is at least one from the list of the following:
   stiffness or modulus of elasticity for at least part of the object,
   integrity of the material bond,
   material state,
   material constitution,
   material composition,
   material stress,
   at least local material dimensioning,
   porosity,
   at least local material density,
   damping characteristic,
   desired geometric parameters.

4. The method according to claim 2, wherein the assignment is carried out on the basis of multiple simulations of the frequency-dependent reference natural oscillation behavior for the object with different object parameters.

5. The method according to claim 1, wherein based on a comparison of the measured natural oscillation behavior and the simulated reference natural oscillation behavior for a specific frequency range (f) or with regard to a specific resonant frequency, information regarding a level of correspondence of the object state or of an object property to a desired object state or a desired object property is derived.

6. The method according to claim 1, wherein adapting object parameters for generating the virtual representation of the object based on a comparison of the measured natural oscillation behavior and the simulated frequency-dependent reference natural oscillation behavior of a reference object.

7. A computer program product comprising a non-transient machine-readable carrier having instructions for controlling or implementing at least the step of deriving an object state on the basis of a comparison of the measured natural oscillation behavior and the frequency-dependent reference natural oscillation behavior in a method according to claim 1.

8. A production method for producing a metal-containing object, the method comprising:
   obtaining a digital model data representing the object,
   manufacturing the object based on the model data by applying or removing manufacturing material point-by-point or layer-by-layer,
   performing object analysis by:
     measuring a frequency-dependent natural oscillation behavior of the object by
       dynamically-mechanically exciting the object in a defined frequency range (f), wherein exciting the object is carried out by means of generating a body oscillation by applying a test signal, and detecting a body oscillation generated in the object on account of the exciting, simulating or measuring a frequency-dependent reference natural oscillation behavior for the object by generating a 3D model as a virtual digital representation of the object or providing a physical reference object, wherein inherent stresses in the object are incorporated into the virtual digital representation, carrying out a finite element analysis on the basis of the virtual digital representation, dynamically or dynamically-mechanically exciting the object or reference object in a simulated manner, calculating or detecting the body oscillation generated in the object or reference object on account of the exciting, and deriving an object state on the basis of a comparison of the measured natural oscillation behavior and the frequency-dependent reference natural oscillation behavior, and deriving a manifestation of a specific manufacturing-dictated object property on the basis of the object state.

9. A production method according to claim 8, wherein based on a comparison of a measured natural oscillation behavior and a simulated reference natural oscillation behavior for the specific frequency range or with regard to a specific resonant frequency, information regarding a level of correspondence of an object property specific to the additive manufacturing to a desired object property is derived.

10. A production method according to claim 8, wherein:
deriving stiffness information for the object based on the first measured frequency-dependent natural oscillation behavior, and determining a manufacturing quality on the basis of the stiffness information.

11. A production method according to claim 8, wherein the object is manufactured at least partly with lightweight construction in accordance with the digital model data and has at least one object portion which is defined by the solidified manufacturing material and which provides a cavity, wherein:
the object portion is shaped in hollow-cylindrical or tubular fashion, or the cavity has an inner stabilization structure.

12. A production method according to claim 8, the manufacturing-dictated object property relates to the defined object portion of the lightweight construction.

13. A production method according to claim 8, wherein the derived manifestation of a specific manufacturing-dictated object property is fed as feedback for the additive manufacturing of the object and a corresponding adaptation of the additive manufacturing is performed.

14. A test system for objects manufactured point-by-point or layer-by-layer, comprising:
a test unit configured for dynamically-mechanically testing an object produced by means of point-by-point or layer-by-layer, manufacturing and for deriving a first object state on the basis thereof, wherein the test unit comprises
an oscillation generator, and
an oscillation pick-up, and is configured in such a way that
the object manufactured point-by-point or layer-by-layer is dynamically-mechanically excitable in a defined frequency range, wherein a body oscillation is generatable by means of a test signal being applied by the oscillation generator, body oscillations, generated in the object on account of the test signal are detectable by the oscillation pick-up, and a frequency-dependent natural oscillation behavior for the object is derivable on the basis of the detected body oscillations, and a first control and processing unit configured for controlling the test unit, wherein the first control and processing unit is furthermore configured for comparing the frequency-dependent natural oscillation behavior with a frequency-dependent reference natural oscillation behavior, wherein the reference natural oscillation behavior is derived by means of a 3D model as a virtual representation of the object, wherein inherent stresses in the object are incorporated into the virtual representation by simulation or by reference measurement, and by means of carrying out a finite element analysis comprising:
dynamically exciting, in a simulated manner, the virtual representation into a virtual frequency range which at least overlaps the defined frequency range, calculating a virtual body oscillation generated in the object on account of the exciting in a simulated manner, for deriving information regarding a level of correspondence between the natural oscillation behavior and the reference natural oscillation behavior, and for outputting the derived information.

15. A system for the tested point-by-point or layer-by-layer manufacturing of an object comprising:
a system according to claim 14, a manufacturing unit configured for the point-by-point or layer-by-layer repeatedly applying and/or removing manufacturing material point-by-point or layer-by-layer, and a second control and processing unit configured for controlling the manufacturing of the object by means of the manufacturing unit on the basis of digital model data for the object, wherein the virtual representation of the object is generated on the basis of the digital model data for the object.

* * * * *